United States Patent Office 3,291,741
Patented Dec. 13, 1966

3,291,741
ANTIFREEZE COMPOSITION
Roger F. Monroe, Midland, and Anthony J. Maciejewski, Bay City, Mich., assignors to The Dow Chemical Company, Midland, Mich., a corporation of Delaware
No Drawing. Filed Aug. 19, 1964, Ser. No. 390,740
8 Claims. (Cl. 252—76)

This invention relates to new corrosion inhibitors for antifreeze fluids and to such fluids containing such inhibitors.

Coolants for internal combustion engines typically consist of 25–50% by weight of an antifreeze fluid, 1–5% of additives and the balance water. The antifreeze fluid is usually essentially ethylene glycol, though the lower alkanols are used to some extent. The additives usually consist of a combination of several corrosion inhibitors, an antifoam agent and, sometimes, a lubricant. A combination of several corrosion inhibitors is required because a typical engine contains a variety of metals in contact with the fluid and no one inhibitor will protect all these metals.

A great variety of inhibitors have been suggested in the art for antifreeze inhibitors. These include the metal borates, phosphates, arsenates, arsenites, molybdates, chromates, nitrates, and nitrites, various amines, mercaptobenzothiazole, benzotriazole, etc., in various combinations. A typical formulation is shown in Patent No. 2,803,604. It consists essentially of benzotriazole in combination with (1) an arsenite, arsenate, or molybdate and (2) a borate or phosphate. This formulation is said to protect all the common metals found in cooling systems, including solder and aluminum, which are particularly vulnerable to corrosion. It has the serious disadvantage, however, that it requires either the extremely toxic arsenic salts or the expensive molybdates. Also, like other formulations recommended for use in systems containing aluminum, it inadequately inhibits the so-called cavitation corrosion of aluminum. This is a phenomenon observed in aluminum pumps whereby the aluminum pump housing suffers pit corrosion at points of cavitation. This often results in serious corrosion, or even perforation, of pump housing even when other aluminum surfaces not subject to cavitation effects are substantially unaffected.

It is an object of this invention to provide new and improved corrosion inhibitors and substantially non-corrosive antifreeze fluids. Another object is to provide such compositions that contain no arsenic. Still another object is to provide antifreeze fluids that do not cause cavitation corrosion or other corrosion of aluminum. Other objects will appear hereinafter.

According to the invention, a superior antifreeze fluid is obtained by dissolving in the base fluid a small but effective amount of a corrosion-inhibiting composition comprising an alkali metal borate, an alkali metal phosphate, a propynyloxynitrobenzene, benzotriazole, 4,4-bis-(3-nitro-4-hydroxyphenyl)pentanoic acid and a piperazine.

The alkali metal borate can be any alkali metal salt of any of the boric acids; i.e., orthoborates, metaborates, tetraborates, pentaborates and the like. As a practical matter, sodium tetraborate is most convenient, being most readily available as the penta- or the deca-hydrate. However, all percentages and proportions set forth herein are based on the anhydrous material unless otherwise specified.

The phosphates can be any alkali metal disbasic phosphate or equivalent. It is well known that the various phosphate salts, like the borates, can be made in situ by the use of appropriate proportions of free acid, or an acid salt thereof, and alkali metal base (hydroxide, carbonate or equivalent). As a practical matter, disodium or dipotassium ortho-phosphate is preferred.

The propynyloxynitrobenzene has a 2 - propynyloxy group which is preferably ortho to a nitro group, though it is effective in the other positions. The preferred compound is o - nitro-2-propynyloxybenzene, although the presence of inert substituents is permissible.

The piperazine compound can be piperazine itself, a phenylpiperazine, or an alkylpiperazine wherein the alkyl group contains up to 8 carbon atoms. 2-methylpiperazine is a preferred species.

While the proportions of the above essential components can be varied considerably, the most satisfactory inhibitors are those compositions falling within the range of proportions set forth in the following table. All parts herein are by weight, based on the total weight of the named components.

TABLE I.—CORROSION INHIBITOR COMPOSITIONS

| Components | Percent by Weight | |
|---|---|---|
| | Useful | Preferred |
| Borate | 20–50 | 25–35 |
| Phosphate | 25–55 | 30–45 |
| Benzotriazole | 3–15 | 8–12 |
| Piperazine | 3–15 | 8–12 |
| Propynyloxynitrobenzene | 1.5–8 | 2–6 |
| Bis-(nitrohydroxyphenyl)-pentanoic acid | 3–15 | 8–12 |

In formulating a corrosion inhibitor within the above ranges it is preferred that the borate and phosphate be used in roughly equal amounts. Thus, preferably, the amount of one should not exceed about 1.5 times the amount of the other.

In formulating an automobile radiator antifreeze concentrate, the above inhibitor composition is dissolved in the glycol or alcohol component in an effective concentration, suitably about 3–6% by weight. As optional additives there may also be included dyes, acid-base indicators, water-pump lubricants, antifoam agents, or other conventional additives. Such concentrates are ordinarily diluted with water to produce an antifreeze fluid containing 50–75% water. As is well known, the water used for such dilutions should preferably not have a high ion content. The chloride, sulfate, carbonate and copper ions are particularly objectionable.

The practice of the invention is illustrated by the following examples.

*Example 1*

The following inhibitor composition was used:

| Component: | Parts by weight |
|---|---|
| $Na_2B_4O_7 \cdot 5H_2O$ | 1.00 |
| $K_2HPO_4$ | 1.00 |
| Benzotriazole | .24 |
| 2-methylpiperazine | .24 |
| 4,4-bis(3-nitro-4-hydroxyphenyl)-pentanoic acid | .24 |
| o-Nitro-(2-propynyloxy)benzene | .12 |

An antifreeze concentrate was prepared by dissolving 2.84 parts of the above inhibitor in 96 parts of ethylene glycol (which commonly contains up to about 10% of diethylene glycol) and 1.16 parts of water.

The above inhibited concentrate was tested for corrosiveness by the standard ASTM test D–1384–61T and by General Motors Specification 1899-M, each sample being diluted to 25% concentration as specified in the test methods. The results are shown in Table II.

TABLE II.—CORROSION TESTS

|  | Test Method | |
|---|---|---|
|  | ASTM | GM |
| pH: | | |
| Initial | 8.2 | 8.0 |
| Final | 7.6 | 8.0 |
| Reserve Alkalinity: | | |
| Initial | 15.2 | 14.4 |
| Final | 11.4 | 14.2 |
| Corrosion Loss, mg.: | | |
| Copper | 3 | 2 |
| Solder | 4 | 1 |
| Brass | 4 | 3 |
| Steel | 3 | 3 |
| Cast Iron | 8 | 4 |
| Cast Aluminum | 10 | 11 |

In addition to the above tests, it was found that the above formulation prevented cavitation corrosion in high-speed coolant pumps having aluminum housings and impellers.

Substantially equivalent results were obtained when the 2-methylpiperazine used above was replaced with 1,4-diphenylpiperazine.

Excellent corrosion protection is likewise obtained when the proportions of the ingredients are varied as set forth in Table I and when the 2-methylpiperazine is replaced with piperazine itself, with a phenylpiperazine, such as 1- or 2-phenylpiperazine or 1,4-diphenylpiperazine, or with an alkylpiperazine, such as 2-ethyl-, 2-propyl-, 2-butyl-, 1-methyl-, 1,4-diamyl-, 1,3-dihexyl- or 2,6-dimethylpiperazine or other lower alkylpiperazine.

The corrosion inhibitor of the invention is also effective in alcohol antifreezes and in water alone.

We claim:
1. An anticorrosive composition comprising:

| Component: | Percent by weight |
|---|---|
| (a) Alkali metal borate | 20–50 |
| (b) Alkali metal phosphate | 25–55 |
| (c) Benzotriazole | 3–15 |
| (d) Piperazine | 3–15 |
| (e) Propynyloxynitrobenzene | 1.5–8 |
| (f) 4,4-bis-(3-nitro-4-hydroxyphenyl)-pentanoic acid | 3–15 | all percentages being based on the total weight of the named components.

2. A composition as defined in claim 1 comprising:

| Component: | Percentage |
|---|---|
| (a) | 25–35 |
| (b) | 30–45 |
| (c) | 8–12 |
| (d) | 8–12 |
| (e) | 2–6 |
| (f) | 8–12 |

3. A composition as defined in claim 1 wherein the alkali metal is sodium or potassium.

4. A composition as defined in claim 3 wherein the component (d) is a piperazine free of substituents other than phenyl and alkyl radicals.

5. A composition as defined in claim 4 wherein the component (e) is o-nitro-2-propynyloxybenzene.

6. An anticorrosive composition comprising:

| Component: | Percent by weight |
|---|---|
| (a) Sodium tetraborate | 25–35 |
| (b) Dipotassium phosphate | 30–45 |
| (c) Benzotriazole | 8–12 |
| (d) 2-methylpiperazine | 8–12 |
| (e) o-Nitro-(2-propynyloxy)benzene | 2–6 |
| (f) 4,4-bis-(3-nitro-4-hydroxyphenyl)-pentanoic acid | 8–12 | all percentages being by weight, based on the total weight of the named components.

7. An anticorrosive antifreeze concentrate comprising the anticorrosive composition of claim 1 and an ethylene glycol-base antifreeze fluid.

8. An antifreeze fluid comprising 25–50% of ethylene glycol and an effective amount of the anticorrosive composition of claim 1.

References Cited by the Examiner
UNITED STATES PATENTS

| 2,752,221 | 6/1956 | Wachter | 21—2.5 |
| 2,803,604 | 8/1957 | Meighen | 252—75 |
| 3,107,221 | 10/1963 | Harrison et al. | 252—392 XR |

LEON D. ROSDOL, *Primary Examiner.*

JULIUS GREENWALD, ALBERT T. MEYERS,
*Examiners.*

J. D. WELSH, *Assistant Examiner.*